United States Patent
Mason

(10) Patent No.: US 12,106,413 B1
(45) Date of Patent: Oct. 1, 2024

(54) JOINT AUTOENCODER FOR IDENTITY AND EXPRESSION

(71) Applicant: Andrew P. Mason, Cottesloe (AU)

(72) Inventor: Andrew P. Mason, Cottesloe (AU)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 17/806,543

(22) Filed: Jun. 13, 2022

Related U.S. Application Data

(60) Provisional application No. 63/210,687, filed on Jun. 15, 2021.

(51) Int. Cl.
*G06T 13/40* (2011.01)
*G06T 17/20* (2006.01)
*G06V 40/16* (2022.01)

(52) U.S. Cl.
CPC ............ *G06T 13/40* (2013.01); *G06T 17/20* (2013.01); *G06V 40/172* (2022.01); *G06V 40/174* (2022.01)

(58) Field of Classification Search
None
See application file for complete search history.

(56) References Cited

U.S. PATENT DOCUMENTS

| | | | |
|---|---|---|---|
| 11,222,466 B1* | 1/2022 | Naruniec | G06T 15/04 |
| 2017/0069124 A1* | 3/2017 | Tong | G06T 17/20 |
| 2019/0213772 A1* | 7/2019 | Lombardi | G06T 15/04 |
| 2020/0184316 A1* | 6/2020 | Kavukcuoglu | H03M 7/3082 |
| 2021/0192839 A1* | 6/2021 | Mason | G06V 40/175 |
| 2021/0279956 A1* | 9/2021 | Chandran | G06T 17/20 |
| 2022/0301348 A1* | 9/2022 | Bradley | G06T 17/20 |

* cited by examiner

*Primary Examiner* — Sultana M Zalalee
(74) *Attorney, Agent, or Firm* — Blank Rome LLP

(57) ABSTRACT

Rendering an avatar for a user in a communication session includes obtaining latent variables for expression and identity of a face, applying a concatenation of the latent variables to an expression decoder of a trained asymmetric joint autoencoder for expression and identification to obtain an expression mesh of a face, and rendering an avatar using the expression mesh of the face. The asymmetric joint autoencoder includes two encoders and two decoders, where an expression decoder utilizes the concatenated latents and the identity decoder utilizes the identity latents and not the expression latents.

20 Claims, 6 Drawing Sheets

JOINT AUTOENCODER FOR IDENTITY AND EXPRESSION

BACKGROUND

Computerized characters that represent and are controlled by users are commonly referred to as avatars. Avatars may take a wide variety of forms, including virtual humans, animals, and plant life. Some computer products include avatars with facial expressions that are driven by a user's facial expressions. One use of facially based avatars is in communication, where a camera and microphone in a first device transmits audio and real-time 2D or 3D avatar of a first user to one or more second users such as other mobile devices, desktop computers, videoconferencing systems and the like. Known existing systems tend to be computationally intensive, requiring high-performance general and graphics processors, and generally do not work well on mobile devices, such as smartphones or computing tablets. Further, existing avatar systems do not generally provide the ability to communicate nuanced facial representations or emotional states in realistic lighting.

DETAILED DESCRIPTION

Figure 1:
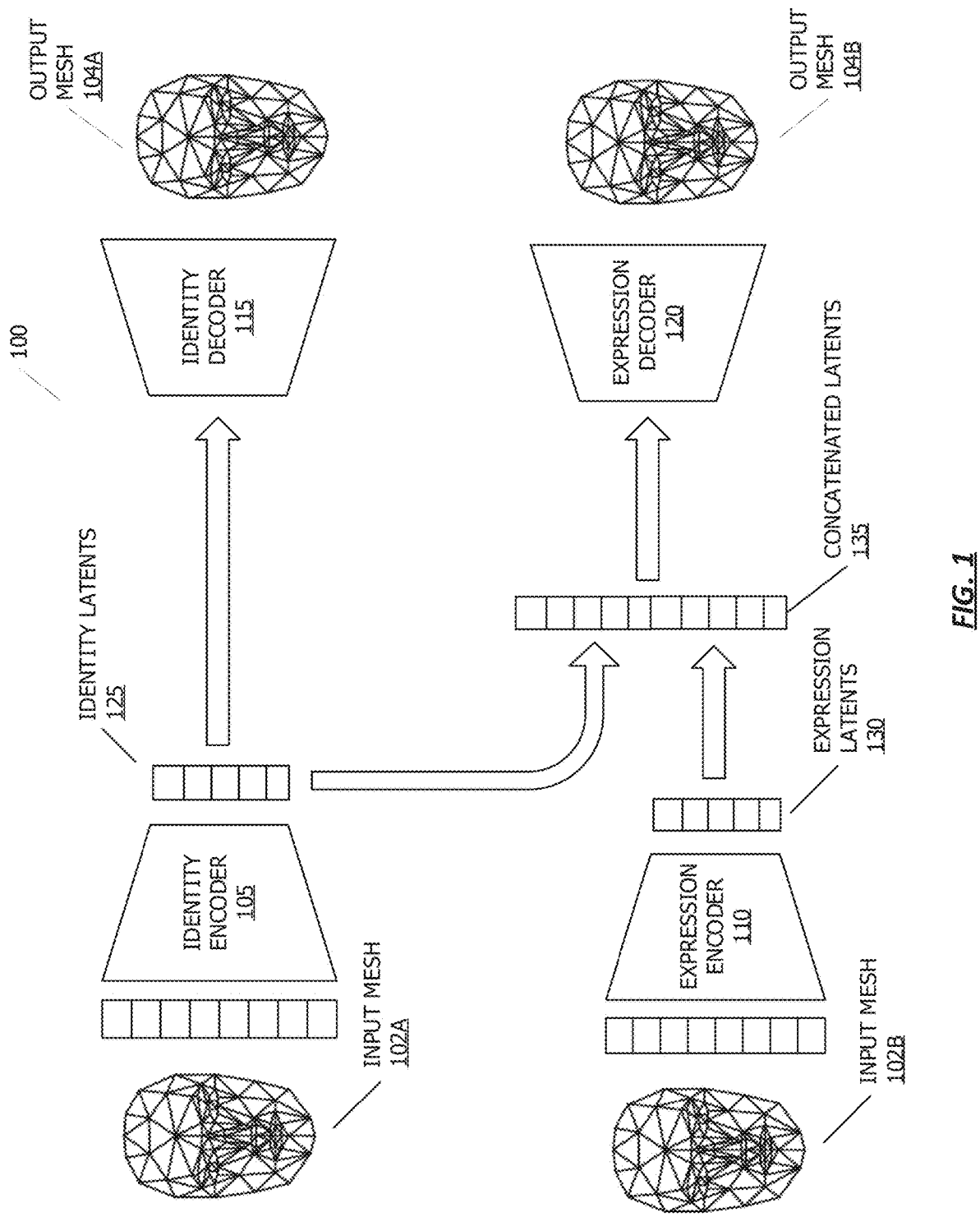
FIG. 1 shows a simplified architecture for a asymmetric joint autoencoder for identity and expression, in accordance with one or more embodiments.

This disclosure relates generally to image processing. More particularly, but not by way of limitation, this disclosure relates to techniques and systems for generating and utilizing machine learning for rendering an avatar with improved expression presentation.

This disclosure pertains to systems, methods, and computer readable media to utilize an asymmetric joint autoencoder for generating an avatar. The asymmetric joint autoencoder may include a first encoder portion for expression and a second encoder portion for identity. The asymmetric joint autoencoder may also include a first decoder for expression and a second decoder for identity. Whereas the identity latents are used as input to the identity decoder, the expression decoder may be trained based on identity latents as well as expression latents.

To generate a photorealistic avatar, a set of identity and expression latents for an expressive face may be received by a device at which the avatar is to be rendered. A combination of the expression and identity latents may be used as input into the trained expression decoder to obtain an expression mesh of the expressive face. The expression mesh may then be used for rendering an avatar representative of the expressive face.

For purposes of this disclosure, an autoencoder refers to a type of neural network used to fit data in an unsupervised manner. The aim of an autoencoder is to learn a representation for a set of data in an optimized form. An autoencoder is designed to reproduce its input values as outputs, while passing through an information bottleneck that allows the dataset to be described by a set of latent variables. The set of latent variables are a condensed representation of the input content, from which the output content may be generated by the decoder. A trained autoencoder will have an encoder portion and a decoder portion, and the latent variables represent the optimized representation of the data.

For purposes of this disclosure, a joint autoencoder comprises an autoencoder architecture composed of multiple encoders and multiple decoders. The set of latent variables are a combined set of latent variables for the multiple encoders and multiple decoders.

For purposes of this disclosure, an asymmetric joint autoencoder is an autoencoder comprising multiple encoders and multiple decoders, where some latent variables are only used for certain decoders.

For purposes of this disclosure, the term "avatar" refers to the virtual representation of a real-world subject, such as a person, animal, plant, object, and the like. The real-world subject may have a static shape or may have a shape that changes in response to movement or stimuli.

A physical environment refers to a physical world that people can sense and/or interact with without aid of electronic devices. The physical environment may include physical features, such as a physical surface or a physical object. For example, the physical environment corresponds to a physical park that includes physical trees, physical buildings, and physical people. People can directly sense and/or interact with the physical environment, such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and in response, one or more characteristics of one or more virtual objects simulated in the XR environment are adjusted in a manner that comports with at least one law of physics. As one example, the XR system may detect head movement and, in response, adjust graphical content and present an acoustic field to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and present an acoustic field to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, and tablets.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints) and that these goals may vary from one implementation to another. It will also be appreciated that such development efforts might be complex and time-consuming but would nevertheless be a routine undertaking for those of ordinary skill in the design and implementation of graphics modeling systems having the benefit of this disclosure.

Referring to FIG. 1, an architecture 100 of an asymmetric joint autoencoder is presented. According to one or more embodiments, the asymmetric joint autoencoder is a neural network which is trained for two characteristics, where each characteristic has its own encoder and decoder. However, whereas the encoder and decoder for one characteristic utilizes latent variables only for that characteristic, the decoder for the second characteristic utilizes latent variables for both characteristics. In some embodiments, the latents used as input for the second decoder include a concatenation of latents produced by the first encoder and the latents produced by the second encoder.

The architecture 100 shows an example architecture of an asymmetric joint autoencoder. In the example presented, the asymmetric joint autoencoder is trained based on identity and expression. As such, the autoencoder may be trained from a set of identity input meshes 102A associated with an identity. In one or more embodiments, the identity encoder 105 may take an input mesh 102A to determine identity deltas from the population mean. That is, given a set of meshes for a population of different users, the identity encoder may be trained to determine the deltas between an individual mesh and an "average" mesh for the population. The identity deltas may be reduced to identity latents 125 by the identity encoder 105, which may be used as input to an identity decoder 115 to generate an output mesh 104A, which is a predictive version of the input mesh 102A based on the identity latents 125. According to one or more embodiments, the input mesh 102A may be a neutral mesh, such as a mesh corresponding to a neutral expression.

In addition, the architecture 100 may use additional input meshes 102B as input into an expression encoder 110. In some embodiments, the expression encoder 110 may be configured to take in an input mesh 102B and reduce the input mesh to a set of expression latents 130. In one or more embodiments, the input mesh 102B may be expression meshes, and the expression latents 130 may be based on a delta between the expression mesh and a neutral mesh. For example, the expression deltas between a particular expression and a neutral expression may be reduced to the expression latents 130 by the expression encoder 110. According to one or more embodiments, the asymmetric joint autoencoder 100 may be trained to produce an output mesh 104B that is a reproduction of the input mesh 102B. The output mesh 104B may be produced by an expression decoder 120. According to one or more embodiments, the expression decoder 120 may utilize as input a set of concatenated latents 135 that include the identity latents 125 and the expression latents 130. As such, the identity characteristics may be used to influence the generation of the expression output mesh 104B, whereas the expression latents 130 do not influence the identity decoder 115 in generating the output mesh 104A.

According to one or more embodiments, the expression decoder, once trained, may be deployed to a client device such that as the device receives latents from another device, where the latents may represent an expression of the user at the other device. In some embodiments, the client device may receive the expression latents in real time as the remote user's expression changes. The identity latents for the remote user may be received only once, for example per communication session, as the identity of the user will not change over the course of a communication session. The client device may concatenate the latents for input into the expression decoder 120 to obtain a mesh that may be used for rendering an avatar representing the remote user. Alternatively, the client device may receive the latents in the concatenated latent form throughout the communication session, for example once per frame.

It should be understood that while the asymmetric joint autoencoder 100 is presented and discussed in terms of identity and expression, in some embodiments, the asymmetric joint autoencoder may be configured to handle any two sets of characteristics, where the latents corresponding to one characteristic influences the other, but the reverse is not true. Said another way, the first descriptor may influence the second descriptor, but the second descriptor may not influence the first descriptor. For example, a decoder for the first descriptor may utilize first descriptor latents but not second descriptor latents, whereas a decoder for the second descriptor may use both the first and second descriptor latents.

Figure 2:
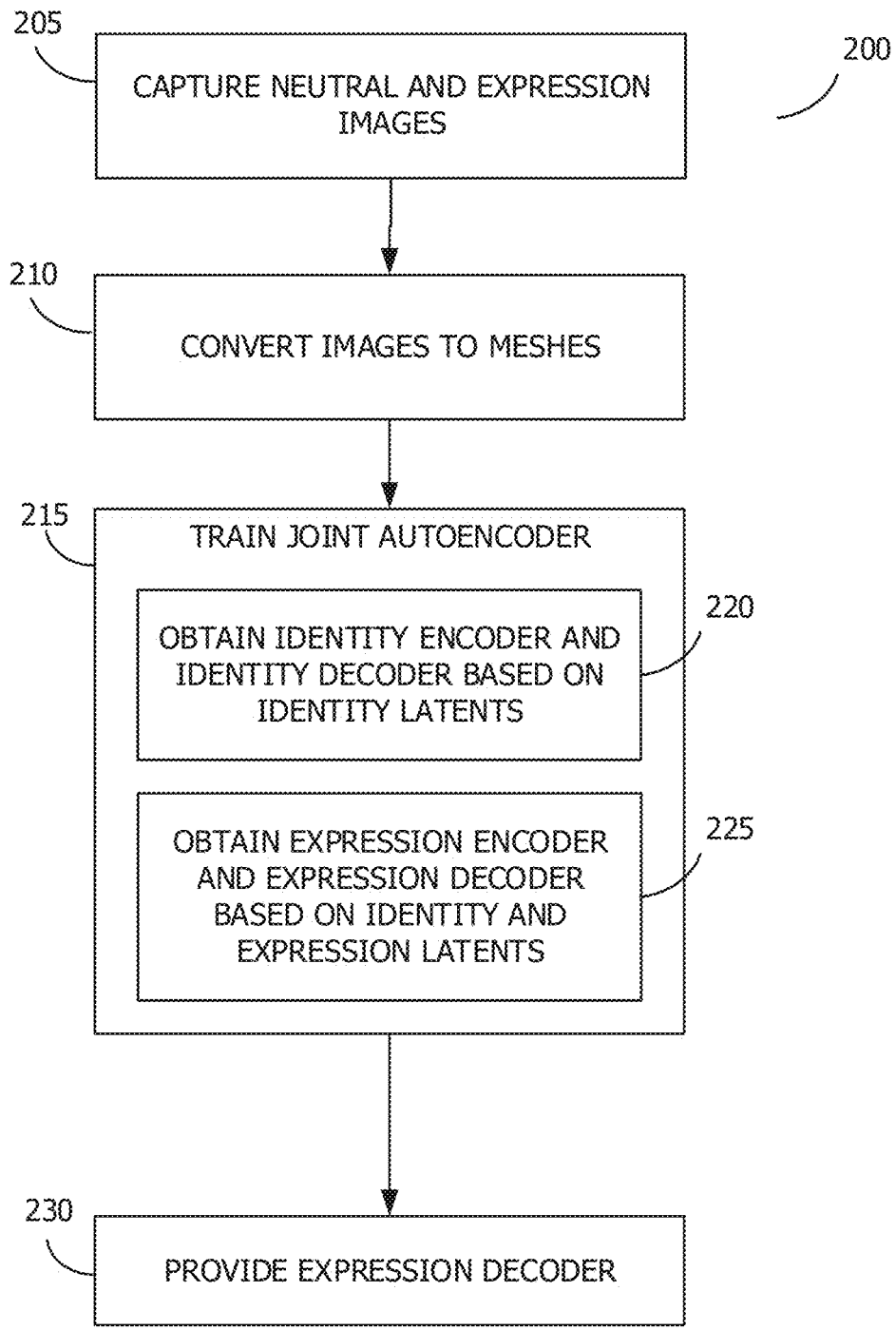
FIG. 2 shows, in flowchart form, a technique for training a joint autoencoder for identity and expression, according to one or more embodiments.

Referring to FIG. 2, a flow diagram is illustrated in which a joint autoencoder is trained. Although the various processes depicted in FIG. 2 are illustrated in a particular order, it should be understood that the various processes described may be performed in a different order. Further, not all of the various processes may be necessary to be performed to train the joint autoencoder.

The flowchart 200 begins at 205, where the device captures neutral and expression images. In one or more embodiments, the expression images may be captured as a series of frames, such as a video, or may be captured from still images or the like. The expression images may be acquired from numerous individuals or a single individual. By way of example, images may be obtained via a photogrammetry or stereophotogrammetry system, a laser scanner or an equivalent capture method. Then at 210, where the device converts the expression images to meshes. Each set of expression images may be converted into an expressive 3D mesh representation using photogrammetry or similar geometry reconstruction method. Alternatively, the autoencoder may be trained on meshes of faces without capturing images of faces.

The flowchart continues at 215, where the joint autoencoder is trained. As described above with respect to FIG. 1, the joint autoencoder may be an asymmetric joint autoencoder. As part of the training process, multiple encoders and decoders may be obtained. As shown at 220, an identity encoder and an identity decoder may be obtained. As described above, the identity encoder may utilize the input meshes to determine identity deltas from an "average" identity mesh. Those identity deltas may be reduced by the identity encoder to a compact representation in the form of identity latents utilized as input into the identity decoder to reproduce the meshes. Similarly, at 225, an expression encoder and an expression decoder may be obtained. As described above, the expression encoder may utilize the input meshes to determine expression deltas from a neutral expression mesh. Those expression deltas may be reduced by the expression encoder to a compact representation in the form of expression latents. The expression decoder may be trained to utilize a concatenation of the identity latents and the expression latents as input to reproduce the meshes.

The flowchart concludes at 230 where the expression decoder is provided for use by an additional device. In one or more embodiments, one or both of the decoder portion and/or one or both of the encoder portions of the trained autoencoder may be provided to one or more devices for use in generating meshes for rendering avatars. For example, in some embodiments, the encoder and/or decoder can be separately provided to and/or utilized by a particular device.

Figure 3:
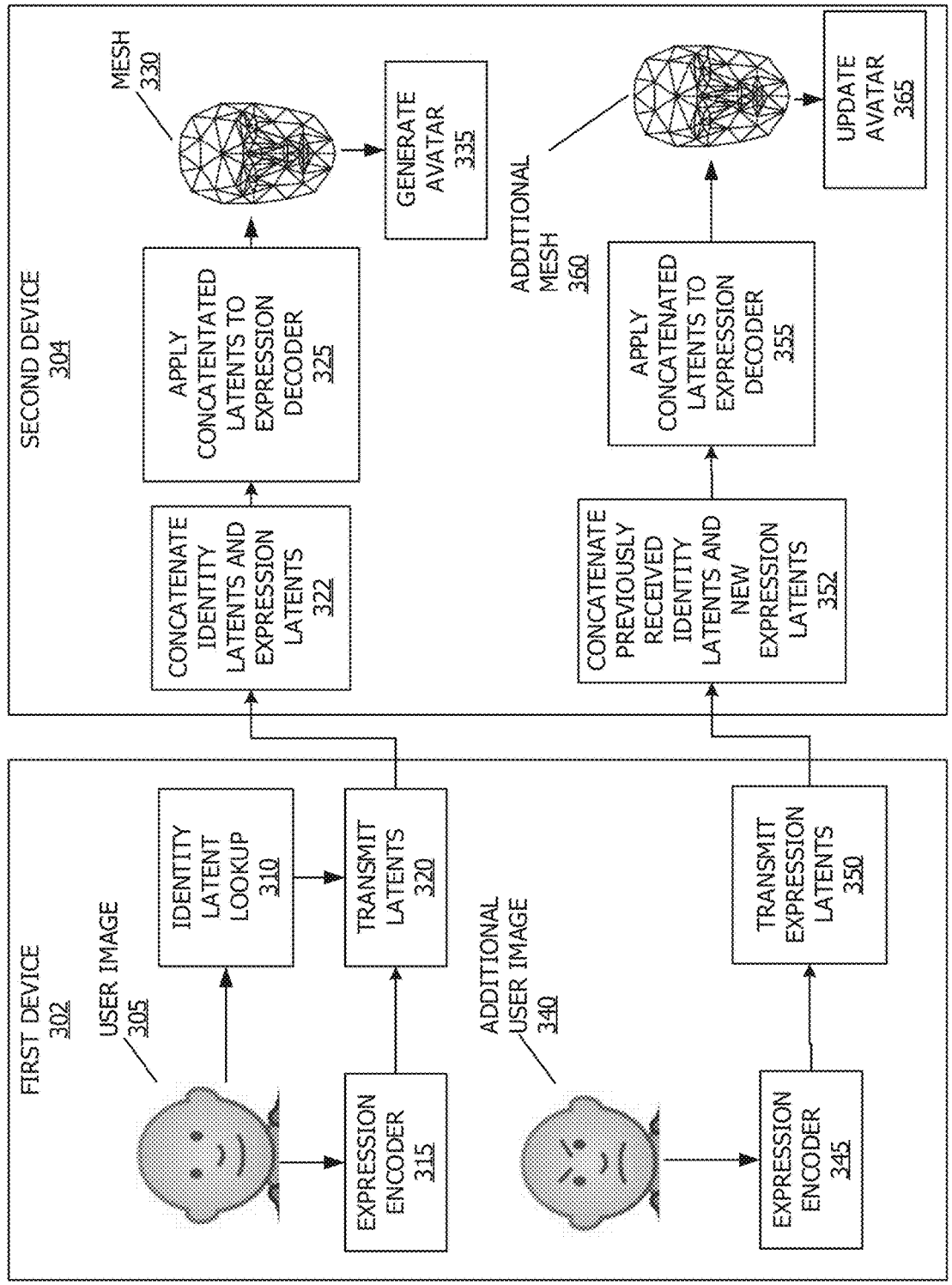
FIG. 3 shows, in flow diagram form, a technique for rendering an avatar, according to one or more embodiments.

Referring to FIG. 3, a flow diagram is depicted in which an avatar is rendered utilizing a trained asymmetric joint autoencoder. According to one or more embodiments, the avatar may be rendered by an avatar module of a client device. The avatar may be rendered on the fly and may be rendered, for example, as part of a gaming environment, an extended reality application, and the like.

The flowchart begins at 305, in which an image of a user of a first device 302 is obtained. In one or more embodiments, the image of the user 305 may be obtained as a still image, as part of a series of frames, or the like. Upon receiving the user image 305, the first device 302 may perform an identity latent lookup at 310. The identity latent lookup may include obtaining identity latents for the user of user image 305. For example, in some embodiments, the identity latents for one or more users of first device 302 may be preregistered such that the latents may be obtained on demand. As another example, the identity latent lookup may be performed by obtaining a mesh representation corresponding to user image 305 and applying the mesh to an identity encoder of the trained asymmetric joint autoencoder to obtain identity latents.

In addition, the first device 302 may utilize an expression encoder 315 to obtain expression latents. In one or more embodiments, the first device 302 may take the user image 305 and generate a mesh representation. The expression encoder 315 may be utilized to obtain expression latents by applying the mesh representation to the expression encoder 315 to obtain the expression latents.

The flow diagram continues at 320, where the identity latents are transmitted to a second device 304. According to one or more embodiments, the first device 302 may concatenate the identity latents and the expression latents prior to transmitting the latents to the second device 304. As another example, the first device 302 may transmit the identity latents and the expression latents separately such that the second device 304 may reuse the identity latents for additional expressive images of a same user. Because identity will not change for a user, or will change infrequently, identity latents may be transmitted less frequently than the expression latents The flow diagram continues at block 322 where the second device 304 concatenates the expression latents corresponding to the user image 305 with identity latents corresponding to the user depicted in user image 305. For example, the expression latents may be received from the transmission at 320, while the identity latents may be received from the transmission at 320 or otherwise obtained from an identity lookup for the user in user image 305. At block 325, the second device 304 applies the concatenated latents to the expression decoder 325. As described above, the expression decoder utilizes the concatenated latents as input and in response provides an expression mesh 330. The expression mesh 330 may be used at 335 to generate an avatar. For example, a texture may be applied to the mesh to render the avatar, such as within part of a multipass technique.

Because the avatar is rendered in real time, it may be based on image data of the face received continuously during a communication session. For example, additional user image data may be received at 340 by the first device 302. The additional user image data 340 may be captured, for example, every frame or otherwise periodically through the communication session. In one or more embodiments, the first device 302 may take the user image 340 and generate a mesh representation. The expression encoder at 345 may be utilized to obtain expression latents by applying the mesh representation to the expression encoder to obtain the updated expression latents. In some embodiments, an additional identity latent lookup may be performed, as described above with respect to 310; however, because the identity latents do not change and were previously transmitted to the second device at 320, it may not be necessary for the first device 302 to retrieve identity latents or to transmit identity latents to second device 304 for the additional user image. Accordingly, at 350, the first device 302 transmits the updated expression latents (e.g., the expression latents corresponding to the additional user image 340) to the second device.

The flow diagram continues at block 352 where the second device 304 concatenates the expression latents corresponding to the user image 340 with identity latents corresponding to the user depicted in user image 340. Because the users of the first device and the second device may be within a same communication session when the user image 305 and additional user image 340 is captured, it may be determined that the identity latents for user image 305 and additional user image 340 are the same. As such, a second identity latent lookup need not be performed, according to some embodiments. Further, the second device 304 may be presumed to already have access to the identity latents from block 322 as described above. At block 355, the second device 304 applies the concatenated latents that includes the new expression latents and the same identity latents to the expression decoder to obtain an additional expression mesh 360. As described above, the expression decoder utilizes the concatenated latents as input and, in response, provides an additional expression mesh 360. The additional expression mesh 360 may be used at 365 to generate an avatar. For example, a texture may be applied to the mesh to render the avatar, such as within part of a multipass technique.

Figure 4:
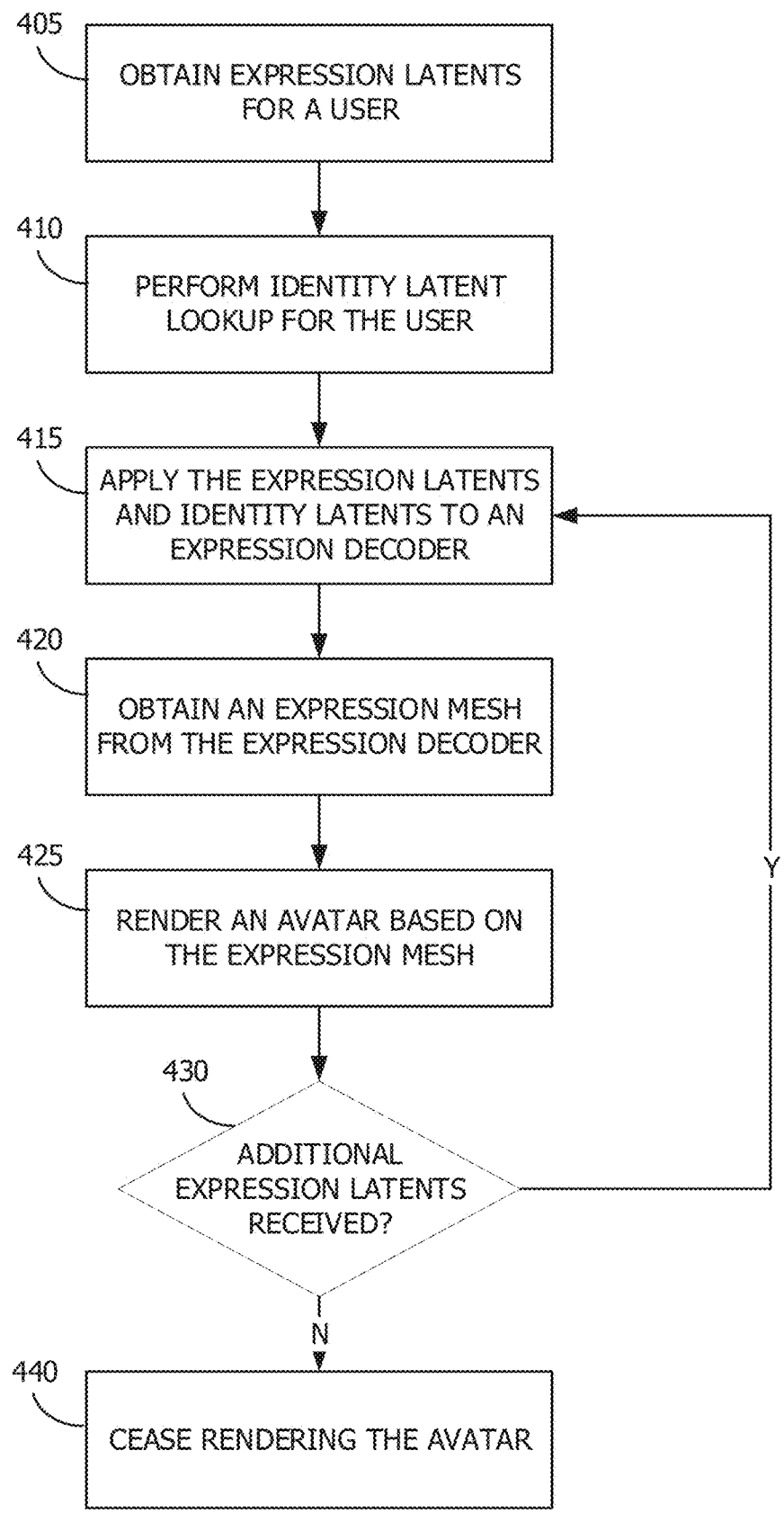
FIG. 4 shows, in flowchart form, a technique for generating rendering an avatar, according to one or more embodiments.

Referring to FIG. 4, a flowchart is depicted in which an expression decoder from a trained asymmetric joint autoencoder is utilized for rendering an avatar, according to one or more embodiments. The example flow is presented merely for description purposes. In one or more embodiments, not all components detailed may be necessary, and in one or more embodiments, additional or alternative components may be utilized.

The flowchart begins at 405, in which expression latents for a user are obtained. As described above, the expression latents may be obtained during a communication session with a remote device, and the expression latents may be a compact representation of the expression of the user of the remote device. In addition, at 410, the local device may perform an identity latent lookup. The identity latent lookup may include obtaining identity latents for the user of the remote device. For example, in some embodiments, the identity latents for the user may be preregistered such that the latents may be obtained on demand, for example, in local storage, from network storage, or from the remote device.

The flow diagram continues at 415, where the local device applies the latents to the expression decoder 325. As described above, in some embodiments, the latents may include a concatenation of expression latents and identity latents. Accordingly, if the latents are received in concatenated form, they may be applied directly to the expression decoder. Alternatively, if the identity latents and the expression latents are received separately, then the local device may concatenate the identity latents and the expression latents prior to applying the concatenated latents to the expression decoder. Then, at 420, the expression decoder utilizes the concatenated latents as input and in response obtains an expression mesh. The expression mesh may be used at 425 to generate an avatar. For example, a texture may be applied to the mesh to render the avatar, such as within part of a multipass technique.

The flowchart continues at 430 where a determination is made regarding whether additional expressive latents are received. The additional expression latents may be received, for example, every frame or otherwise periodically through the communication session. Accordingly, the additional expressive latents may be received throughout a communication session to represent the dynamic change in user expression of a user of the remote device. If no additional expression latents are received, for example, if the communication session ceases, then the flowchart continues at 440, and the local device ceases to render the avatar.

Returning to 430, if a determination is made that additional expression latents are received, then the flowchart returns to 415 and the expression latents and the identity latents are applied to an expression decoder in order to obtain an updated expression mesh, from which an avatar may be rendered.

Figure 5:
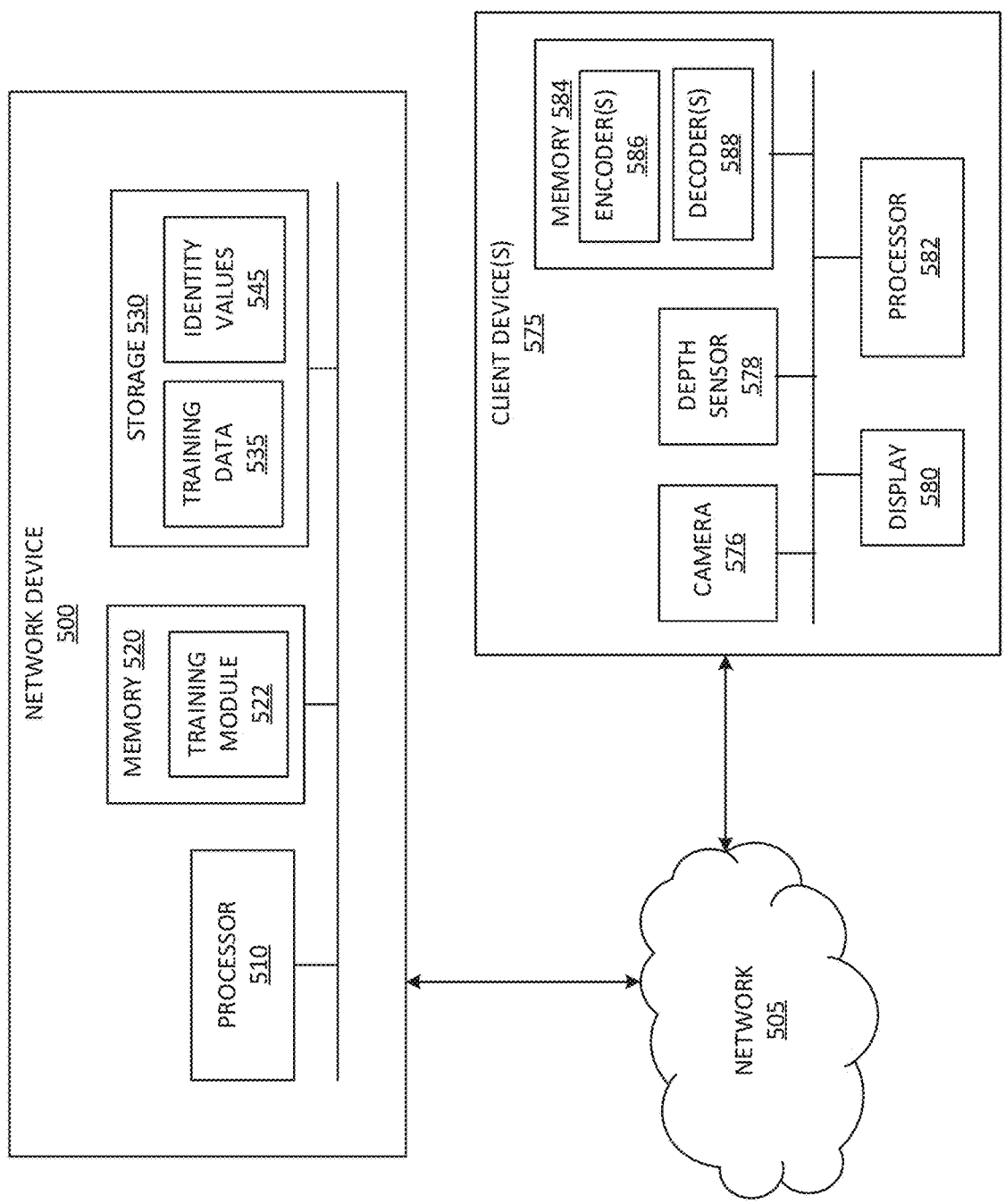
FIG. 5 shows, in block diagram form, a multifunction electronic device in accordance with one or more embodiments.

Referring to FIG. 5, a simplified block diagram of a network device 500 is depicted, communicably connected to a client device 575, in accordance with one or more embodiments of the disclosure. Client device 575 may be part of a multifunctional device, such as a mobile phone, tablet computer, personal digital assistant, portable music/video player, wearable device, base station, laptop computer, desktop computer, network device, or any other electronic device. Network device 500 may represent one or more server devices or other network computing devices within which the various functionality may be contained, or across which the various functionality may be distributed. Network device 500 may be connected to the client device 575 across a network 505. Illustrative networks include, but are not limited to, a local network such as a universal serial bus (USB) network, an organization's local area network, and a wide area network such as the Internet. According to one or more embodiments, network device 500 is utilized to train a model using training data 535, such as images of faces under various lighting to generate an asymmetric joint autoencoder network, for example, by training module 522. Further, network device 500 may utilize the trained asymmetric joint autoencoder to generate a geometric expression mesh for a particular user presenting a particular expression. During the training process, or during inference, identity latents for various users may be registered such that they do not need to be recalculated. In some embodiments, identity latents may be stored within identity values 545 of storage 530. Accordingly, one or more client devices 575 may perform an identity latent lookup by requesting preregistered identity latents from network device 500, in accordance with one or more embodiments. Client device 575 is generally used to generate and/or present an avatar which is rendered in part based on identity and expression. It should be understood that the various components and functionality within network device 500 and client device 575 may be differently distributed across the devices or may be distributed across additional devices.

Network device 500 may include processor 510, such as a central processing unit (CPU). Processor 510 may be a system-on-chip, such as those found in mobile devices, and include one or more dedicated graphics processing units (GPUs). Further, processor 510 may include multiple processors of the same or different type. Network device 500 may also include a memory 520. Memory 520 may each include one or more different types of memory, which may be used for performing device functions in conjunction with processor 510. For example, memory 520 may include cache, ROM, RAM, or any kind of transitory or non-transitory computer-readable storage medium capable of storing computer-readable code. Memory 520 may store various programming modules for execution by processor 510, including training module 522. Network device 500 may also include storage 530. Storage 530 may include one more non-transitory computer-readable mediums, including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM).

Client device 575 may be an electronic device with components similar to those described above with respect to network device 500. Client device 575 may include, for example, a memory 584 and processor 582. Client device 575 may also include one or more cameras 576 or other sensors, such as depth sensor 578, from which depth of a scene may be determined. In one or more embodiments, each of the one or more cameras 576 may be a traditional RGB camera or a depth camera. Further, cameras 576 may include a stereo camera or other multicamera system, a time-of-flight camera system, or the like which capture images from which depth information of a scene may be determined. Client device 575 may allow a user to interact with XR environments. There are many different types of electronic systems that enable a person to sense and/or interact with various XR environments. Examples include head-mounted systems, projection-based systems, HUDs, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display device 580 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In accordance with one or more embodiments, memory 584 may store one or more encoders 586 and one or more decoders 588. According to one or more embodiments, the one or more encoders 586 and one or more decoders 588 may include, for example, the expression autoencoder, expression decoder, identity encoder, and identity decoder, as described above. In one or more embodiments, each of the one or more encoders 586 and one or more decoders 588 may be "hardened" from the trained asymmetric joint autoencoder, for example trained by training module 522. As described above, the one or more encoders 586 may include an identity encoder and an expression encoder. The identity encoder may be trained to take a mesh of a particular user and reduce the deltas between the user and an "average" face to obtain identity latents. The expression encoder may be trained to take a mesh of an expressive face and reduce the deltas between the expression and a neutral mesh to obtain expression latents. The one or more decoders 588 may include, for example, an identity decoder and an expression decoder. The identity decoder may be trained to use identity latents to reproduce a mesh of a particular users. The expression decoder may be trained to use a concatenation of the identity latents and the expression latents to reproduce an expression mesh.

Although network device 500 is depicted as comprising the numerous components described above, in one or more embodiments, the various components may be distributed across multiple devices. Particularly, in one or more embodiments, one or more of the training module 522 and identity values 545 may be distributed differently across the network device 500 and the client device 575, or the functionality of either of the training module 522 and identity values 545 may be distributed across multiple modules, components, or devices, such as network devices. Accordingly, although certain calls and transmissions are described herein with respect to the particular systems as depicted, in one or more embodiments, the various calls and transmissions may be made differently based on the differently distributed functionality. Further, additional components may be used, and some combination of the functionality of any of the components may be combined.

Figure 6:
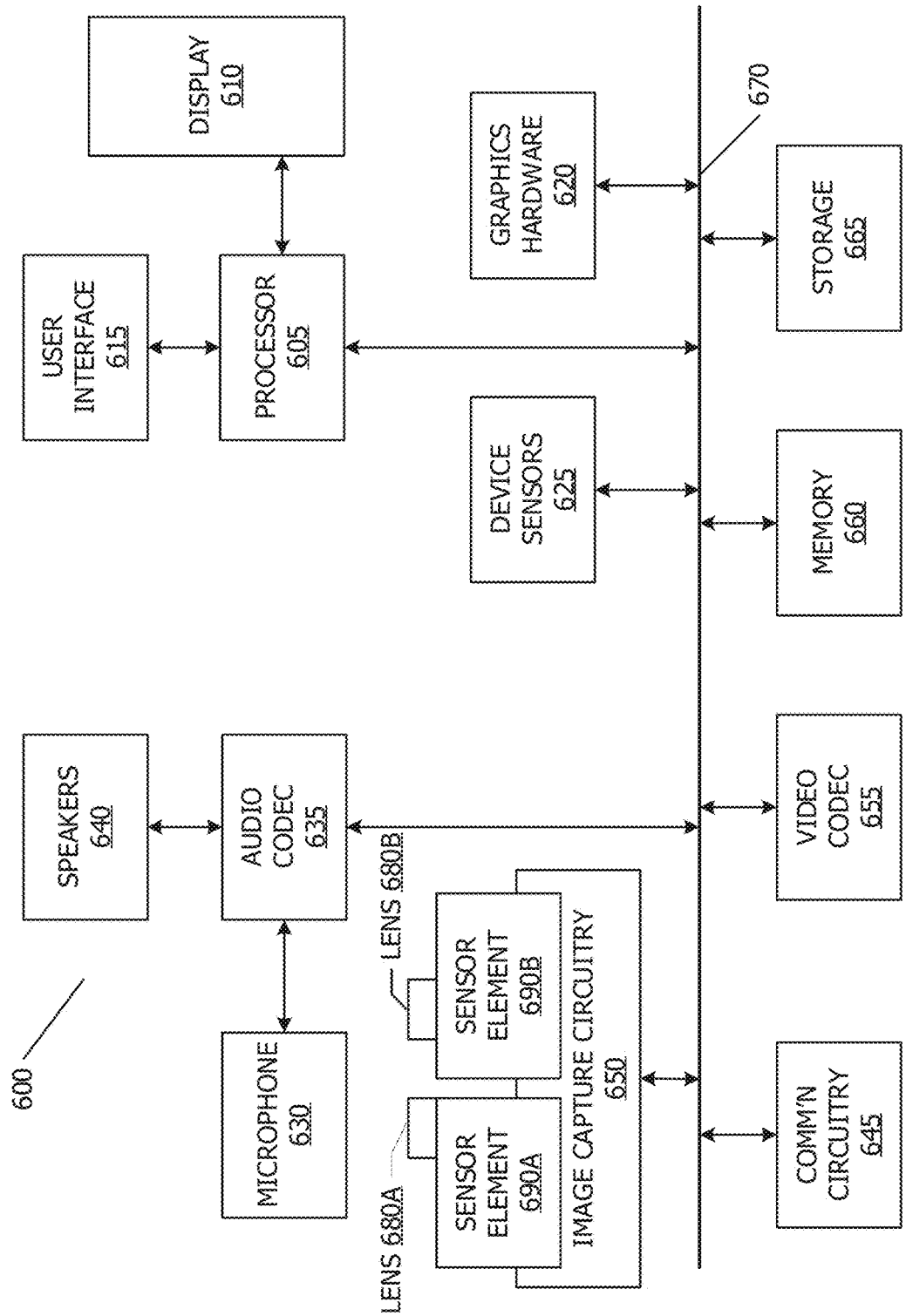
FIG. 6 shows, in block diagram form, a computer system in accordance with one or more embodiments.

Referring now to FIG. 6, a simplified functional block diagram of illustrative multifunctional electronic device 600 is shown according to one embodiment. Multifunctional electronic device 600 may have some or all of the described components of a multifunctional electronic device described herein. Multifunctional electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., camera system), video codec(s) 655 (e.g., in support of digital image capture unit), memory 660, storage device 665, and communications bus 670. Multifunctional electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip, such as those found in mobile devices, and may include a dedicated GPU. Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 in processing graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a shorter focal length than lens assembly 680B. Each lens assembly may have a separate associated sensor element 690A or 690B. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620 and/or a dedicated image processing unit or pipeline incorporated within image capture circuitry 650. Images so captured may be stored in memory 660 and/or storage 665.

Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer-readable storage mediums, including, for example, magnetic disks (fixed, floppy, and removable) and tape, optical media such as CD-ROMs and DVDs, and semiconductor memory devices such as EPROM and EEPROM. Memory 660 and storage 665 may be used to tangibly retain computer program instructions or code organized into one or more modules and written in any desired computer programming language. When executed by, for example, processor 605, such computer program code may implement one or more of the methods described herein.

The present disclosure recognizes that the use of such personal information data in the present technology can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions or the arrangement of elements shown should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method for generating an expressive avatar comprising:
    obtaining expression latent variables for a face, wherein the expression latent variables are derived from an input mesh of a facial expression of the face;
    obtaining identity latent variables for the face;
    applying a concatenation of the expression latent variables to an expression decoder of a trained asymmetric joint autoencoder for expression and identification to obtain an expression mesh of the face; and
    generating an avatar based on the expression mesh of the face.

2. The method of claim 1, further comprising:
    applying the identity latent variables to an identity decoder of the asymmetric joint autoencoder to obtain an identity mesh for the face.

3. The method of claim 2, wherein the expression latent variables are usable as input for the expression decoder, and wherein the expression latent variables are not usable as input for the identity decoder.

4. The method of claim 1, further comprising:
    receiving additional expression latent variables for a face;
    applying a concatenation of the additional expression latent variables and identity latent variables to the expression decoder to obtain an additional expression mesh of the face; and
    generating an avatar based on the additional expression mesh of the face.

5. The method of claim 4, wherein the expression latent variables are received from a remote device and wherein the identity latent variables are received less frequently than the expression latent variables.

6. The method of claim 1, wherein the expression latent variables are obtained from an expression encoder of the trained asymmetric joint autoencoder, and wherein the identity latent variables are obtained from an identity encoder of the trained asymmetric joint autoencoder.

7. The method of claim 1, wherein the asymmetric joint autoencoder comprises:
    an identity encoder portion configured to produce the identity latent variables,
    an expression encoder portion configured to produce the expression latent variables, and
    the expression decoder configured to produce an expression mesh based on the identity latent variables and the expression latent variables.

8. The method of claim 7, wherein the asymmetric joint autoencoder further comprises an identity decoder portion configured to generate an output mesh from the identity latent variables and not from the expression latent variables.

9. A non-transitory computer-readable medium comprising computer-readable code executable by one or more processors to:

obtain expression latent variables for a face, wherein the expression latent variables are derived from an input mesh of a facial expression of the face;
obtain identity latent variables for the face;
apply a concatenation of the expression latent variables to an expression decoder of a trained asymmetric joint autoencoder for expression and identification to obtain an expression mesh of the face; and
generate an avatar based on the expression mesh of the face.

10. The non-transitory computer-readable medium of claim 9, further comprising computer-readable code to:
apply the identity latent variables to an identity decoder of the asymmetric joint autoencoder to obtain an identity mesh for the face.

11. The non-transitory computer-readable medium of claim 10, wherein the expression latent variables are usable as input for the expression decoder and wherein the expression latent variables are not usable as input for the identity decoder.

12. The non-transitory computer-readable medium of claim 9, further comprising:
receive additional expression latent variables for a face;
apply a concatenation of the additional expression latent variables and identity latent variables to the expression decoder to obtain an additional expression mesh of the face; and
generate an avatar based on the additional expression mesh of the face.

13. The non-transitory computer-readable medium of claim 12, wherein the expression latent variables are received from a remote device and wherein the identity are received less frequently than the expression latent variables.

14. The non-transitory computer-readable medium of claim 9, wherein the expression latent variables are obtained from an expression encoder of the trained asymmetric joint autoencoder and wherein the identity latent variables are obtained from an identity encoder of the trained asymmetric joint autoencoder.

15. The non-transitory computer-readable medium of claim 9, wherein the asymmetric joint autoencoder comprises:
an identity encoder portion configured to produce the identity latent variables,
an expression encoder portion configured to produce the expression latent variables, and
the expression decoder configured to produce an expression mesh based on the identity latent variables and the expression latent variables.

16. The non-transitory computer readable medium of claim 15, wherein the asymmetric joint autoencoder further comprises an identity decoder portion configured to generate an output mesh from the identity latent variables and not from the expression latent variables.

17. A system comprising:
one or more processors;
one or computer-readable media comprising computer-readable code executable by the one or more processors to:
obtain expression latent variables for a face, wherein the expression latent variables are derived from an input mesh of a facial expression of the face;
obtain identity latent variables for the face;
apply a concatenation of the expression latent variables to an expression decoder of a trained asymmetric joint autoencoder for expression and identification to obtain an expression mesh of the face; and
generate an avatar based on the expression mesh of the face.

18. The system of claim 17, further comprising computer readable code to:
apply the identity latent variables to an identity decoder of the asymmetric joint autoencoder to obtain an identity mesh for the face.

19. The system of claim 18, wherein the expression latent variables are usable as input for the expression decoder and wherein the expression latent variables are not usable as input for the identity decoder.

20. The system of claim 17, further comprising:
receive additional expression latent variables for a face;
apply a concatenation of the additional expression latent variables and identity latent variables to the expression decoder to obtain an additional expression mesh of the face; and
generate an avatar based on the additional expression mesh of the face.

* * * * *